(12) United States Patent
Reichlin (10) Patent No.: US 10,407,086 B2
(45) Date of Patent: Sep. 10, 2019

(54) DEVICE AND METHOD FOR OPERATING FUNCTIONAL UNITS ARRANGED IN A DECENTRALIZED MANNER

(71) Applicant: SIEMENS MOBILITY GMBH, Zurich (CH)

(72) Inventor: Anton Reichlin, Winterthur (CH)

(73) Assignee: Siemens Mobility AG, Zurich (CH)

( * ) Notice: Subject to any disclaimer, the term of this patent is extended or adjusted under 35 U.S.C. 154(b) by 463 days.

(21) Appl. No.: 14/902,637

(22) PCT Filed: Jun. 25, 2014

(86) PCT No.: PCT/EP2014/063358
§ 371 (c)(1),
(2) Date: Jan. 4, 2016

(87) PCT Pub. No.: WO2015/000757
PCT Pub. Date: Jan. 8, 2015

(65) Prior Publication Data
US 2016/0167686 A1  Jun. 16, 2016

(30) Foreign Application Priority Data

Jul. 2, 2013 (EP) .................................... 13174634
Jul. 30, 2013 (EP) .................................... 13178451

(51) Int. Cl.
*B61L 27/04* (2006.01)
*B61L 27/00* (2006.01)
(Continued)

(52) U.S. Cl.
CPC .............. *B61L 27/04* (2013.01); *B61L 19/06* (2013.01); *B61L 27/0005* (2013.01); *B61L 27/0077* (2013.01); *G05B 15/02* (2013.01)

(58) Field of Classification Search
CPC ... B61L 27/0005; B61L 27/0077; B61L 27/04
(Continued)

(56) References Cited

U.S. PATENT DOCUMENTS 6,782,833 B2 * 8/2004 Nightall .................. B60M 3/00
 104/298
7,701,077 B2 4/2010 Brown et al.
(Continued)

FOREIGN PATENT DOCUMENTS

CN 1758503 A 4/2006
CN 101428565 A 5/2009
(Continued)

*Primary Examiner* — Zachary L Kuhfuss
(74) *Attorney, Agent, or Firm* — Laurence Greenberg; Werner Stemer; Ralph Locher (57) ABSTRACT

A device and a method for operating decentralized functional units in an industrial system include a) a higher-level control system which exchanges information with the decentralized functional units by data telegrams, b) a data transport network with network access points; c) communication units connected to a network access point and providing the decentralized functional units with access to the data transport network; d) an energy transport network to which the decentralized functional units are connected and which supplies electric energy to the decentralized functional units; e) intelligent energy storage devices connected to the energy transport network and consuming or outputting energy in accordance with the higher-level control system and/or with at least one of the remaining energy storage devices. The energy transport network has energy supply points distributed along a bus structure. Selectively one of at least two independent energy backbones can supply corresponding electric power to the supply points.

16 Claims, 5 Drawing Sheets

(51) Int. Cl.
  *B61L 19/06* (2006.01)
  *G05B 15/02* (2006.01)
(58) Field of Classification Search
  USPC .............................................. 246/3, 7; 191/2
  See application file for complete search history.

(56) References Cited

U.S. PATENT DOCUMENTS

| | | |
|---|---|---|
| 9,156,484 B2 | 10/2015 | Reichlin et al. |
| 2010/0114801 A1* | 5/2010 | Plishner .............. B60L 11/1816 705/412 |
| 2015/0246614 A1* | 9/2015 | Dames .................... B60L 5/005 191/10 |

FOREIGN PATENT DOCUMENTS

| | | |
|---|---|---|
| DE | 102010045462 A1 | 3/2012 |
| EP | 2301202 A1 | 3/2011 |
| EP | 2549620 A2 | 1/2013 |
| WO | 2008025414 A2 | 3/2008 |
| WO | 2008141706 A1 | 11/2008 |
| WO | 2013013908 A2 | 1/2013 |

\* cited by examiner

DEVICE AND METHOD FOR OPERATING FUNCTIONAL UNITS ARRANGED IN A DECENTRALIZED MANNER

BACKGROUND OF THE INVENTION

Field of the Invention

The present invention relates to a device and a method for operating decentralized functional units arranged in an industrial installation.

Such decentralized functional units are used in particular in rail traffic networks, such as in the railroad for example, where said units are used to control vehicle-influencing and/or vehicle-monitoring units and monitor them with regard to their functionality and to accept process data and acknowledge it to a central control and/or supervision center, such as a command and control center or an interlocking for example. Signals, switches, balises, line cables, track magnets and the like, as well as sensors for capturing process variables of the moving train, such as power consumption, speed and the like, can be considered as train-influencing units, which thus give instructions to the vehicle driver or even intervene directly in the vehicle control or directly set a safe route. Likewise balises and line cables, but also axle counters and track circuits and other track availability notification systems can be said to be train and track section monitors. Basically however the present invention relates to all industrial installations in which functional units are distributed over longer distances and yet still have to be controlled centrally. The central control in such cases can be handled by a control center at a fixed location, but also by a virtual control center not at a fixed location.

In rail traffic it is usually the case that these decentralized functional units are controlled by an interlocking or a remote interlocking computer. Standardized copper cables are generally provided nowadays for data transfer between the interlocking and the functional units in the track area, for which the classical setting distance lengths, because of the physical transmission parameters, the cable coatings (RLC), are restricted in practice to an upper limit of 10 km. With certain types of functional units however these upper limits can also lie at a maximum of just 6.5 km.

Nowadays however data networks are already being employed in railroads which are used for example for interchange of data between adjacent interlockings or between the interlockings and control systems. They are however not used in such a way as to control and to monitor train-influencing and/or train-monitoring functional units, in order by doing so to make it possible to bridge almost any given setting distances. These networks are instead designed as a type of data transport network (DTN), e.g. an optical transport network, and are employed for the transfer of data for the operational level and the like.

These types of data network allow a very much greater number of degrees of freedom in respect of
- the definition of the position of the coupling points for the connection of interlocking and control system installations or parts thereof and thus of their installation sites,
- the transmission method applied and the communication distances between different installation parts.

These data networks thus occasionally make possible a significant improvement in the price-performance ratio and yet still allow a highly reliable and correspondingly safe interchange of data of the railroad safety devices along rail installations.

Clear examples of applications for such data networks are branch sections or sections with ETCS Level 2 or long tunnel sections, for which currently, because of the limits for the setting distance lengths with conventional interlocking cables, an arrangement of interlocking computers within tunnels is made necessary. The harsh deployment conditions obtaining therein demand that the interlocking computers are encapsulated in compartments or containers and/or operated with air conditioning. Maintenance in these cases is correspondingly expensive. The overall problem thus consists of interlocking and external installation parts not being able to be at just any distance from one another because of the limited setting distances.

The innovative data networks have a disadvantage however to the extent that basically each centralized and decentralized functional unit must be coupled in to such a data network in a suitable manner via an access point and in a redundant manner for reasons of availability. Thus at the moment a comparatively high outlay for coupling with the data network is necessary at an individual network node for connection of a functional units, with at the same time only a comparatively small data transfer rate in relation to the network capacity. While current glass fiber networks for example allow for transmission rates extending from Giga-Bit through to TeraBit transfer power, these transmission rates are however only used very marginally in these safety applications.

At the same time, above and beyond this, an economic interest on the part of the railroad infrastructure operators can be discerned for continuing to use the existing so-called long-life interlocking cables (copper cables adapted to the rail tracks) which are currently employed for the operation of the functional units by the interlockings, for the control of the external installations.

To achieve this object a device and a method are known from European patent application EP 2 301 202 A1 for controlling and/or monitoring decentralized functional units arranged along a traffic network, which includes the following core items:

a) A superordinate control system which interchanges information with the decentralized functional units by means of data telegrams, b) A data transport network with a number of network access points, wherein the superordinate control system is coupled via at least one network access point to the data transport network;

c) Communication units, which are connected in each case to a network access point, wherein:

d) The decentralized functional units are grouped together into subgroups, each with its own subnetwork and wherein e) The subnetwork of each of the subgroups is coupled at each of its two ends to the data transport network via a communication unit and via a network access point.

In this way one digital transport network can be used for coupling-in of the decentralized functional units, which is robust in relation to a single error event in all respects yet still allows a very clever use of copper cables widely used in railroad technology, for example previously available interlocking cables, and ultimately also only needs a comparatively small number of network access points.

Such a device is able to be employed in this case in an especially advantageous manner for a rail network for railroad traffic. Consequently it is then expedient, in a further advantageous embodiment, to couple traffic-monitoring and traffic-control functional units, such as especially signals, switches, axle counters, track circuits, point and linear-type train influencing elements, into the data transport network by means of the decentralized functional units.

The structure of technical installations, also especially in the rail infrastructure, is designed on the basis of the more than 100 years of history of industrial systems engineering and railroads, for robustness and reliability. As the system was conceived in those days, the external elements of the railroad safety installations in particular were connected by relatively heavy cable wires, to enable the switching states over the defined distances to be safely detected, i.e. the system was designed in accordance with the peak loads with sufficient reserve. With the switching process of the external elements information is transferred via the energy injection points as well. However it obviously also follows that the distances possible are restricted by the detectable energy flow. As regards current aspects of flexibility, costs and resource policy, these established concepts, as well as the communication structure disclosed by EP 2 301 202 A1, urgently require innovation in the area of energy supply as well. As part of the modernization initiated with such systems, the Mobility division of Siemens will be undertaking fundamental innovations as regards its interlocking architectures in the coming years, wherein the solution for decentralizing the control and signaling systems will be fully taken into account. This means that in the final configuration all elements to be controlled and monitored (signals, switches, train safety systems, track availability systems such as axle counting points, railroad crossings) will be given a control or signaling point locally on the track—referred to below as an element controller EC or decentralized functional unit DFE.

Since the strategic basis for the future derived from the two architecture changes listed below in the electronic interlockings from Siemens will lead to the previous coupling of information and energy being removed, as well as the introduction of a real-time-capable and high-availability wide area communications system between the interlocking computer (central control unit) and the setting and monitoring devices (Element Controllers EC) required along the track, the supply of energy from the interlocking to the element controllers on the track is to be completely redesigned, for which a solution is disclosed in international patent application WO 2013/013908 A1.

This solution provides for a device and a method for operating decentralized functional units arranged in an industrial installation, comprising:
a) A superordinate control system which interchanges information with the decentralized functional units by means of data telegrams,
b) A data transport network with a number of network access points, wherein the superordinate control system is coupled via at least one network access point to the data transport network;
c) Communication units, which are connected in each case to a network access point and provide the decentralized functional units with access to the data transport network,
d) An energy transport network to which the decentralized functional units are connected and which supplies the decentralized functional units with electrical energy; and
e) A number of intelligent energy stores connected to the energy transport network, which accept energy and/or output it in co-ordination with the superordinate control system and/or with at least one of the other energy stores.

In this way the energy transport network is now completely decoupled from an interlocking and, thanks to the energy stores provided, can now be designed in respect of cabling and transmission capacity for a certain predetermined basic load, wherein load peaks of electrical power consumption, for example when changing the position of a switch, closing and opening a rail crossing, are smoothed by the intelligent energy stores. The energy stores are referred to as intelligent because, for power consumption and/or power output, they co-ordinate with the superordinate control system and/or at least one of the other energy stores to the extent that charging and/or discharging can take place in a controlled, checked manner.

Based on the current interlocking architecture with decentralized stations, but point-to-point energy supply, a new, innovative approach is adopted by the present invention. The current cabling- and labor-intensive point-to-point connections for the power supply or the energy supply of the track-side peripheral elements (called an element controller or also a decentralized functional unit) are replaced by wire-saving and simple-to-install bus or ring lines. The use of intelligent decentralized energy stores makes simple energy supply of the element controllers along the track even over large distances possible, with cables having a small wire cross-section. Brief peak loads, such as the changing of a switch or the opening of the barrier of a railroad crossing, are satisfied locally by the energy stores also able to be implemented as short-term energy stores. The installations thus no longer have to be dimensioned for the "worst case" energy consumption, but it is sufficient to design them for average energy consumption.

This is actively supported by a superordinate intelligent energy management over the entire installation for demand-driven distribution of the energy at the individual consumers. Intelligent energy management takes account on the one hand of the availability demanded for a specific installation depending on the route category and also the actual traffic volume in rail operation. State-of-the-art storage technologies, e.g. SuperCaps (e.g. decentralized short-term energy stores) or flywheel energy stores with composite materials as system components can be used as the energy stores. This means that the present invention also successfully replaces the current battery-supported UPS systems (lead accumulators) wherever possible by more favorable and ecologically better storage components. A further innovation in such cases is also represented by the inherent intelligence of the individual energy stores in the overall system.

Depending on the arrangement of the store in the network topology, not only is energy to be supplied on a demand-driven basis for a directly assigned consumer, but it should also be possible to feed energy back into the overall system. The redundancy of the energy provision is increased thereby and the availability of the interlocking system can be safeguarded in this way or even enhanced compared to current architecture. In addition the use of intelligent energy stores also results in very far-reaching opportunities for flexible design of the interworking infrastructure or generally of energy networks. Smart grids could be possible relatively simply for example on the basis of the intelligent stores described here, without major parts of an existing energy distribution network having to be switched over entirely.

With this approach not only is the previous point-to-point line routing for the supply of energy along the track put onto a new foundation, but likewise the spatially limited extent of interlocking installations resulting from this (0 to 6.5 km) is removed. In the future this will make possible the implementation of electronic interlocking architectures which take account both of the requirements for functionality, reliability and maximum availability, and also satisfy aspects of the preservation of resources, sustainability, energy efficiency and ecological and economic design of the railroad infrastructures.

The invention disclosed in WO 2013/013908 A1 however is far from limited to the interlocking architecture of railroad installations application described, but goes far beyond this. Future examples envisaged are energy management based on decentralized energy stores for buildings or for large installations in the production or processing industry.

Basically this approach shows the feasibility of an energy supply completely decoupled from the interlocking for the element controllers arranged decentrally as well as the functional units controlled by said controllers, which are disposed far out in the periphery in a railroad infrastructure for example. Previously the supply security of the energy bus provided for this supply has not been investigated so closely. An obvious measure here would be the redundant design of the energy bus, but this would again entail an additional outlay in cabling and installation.

BRIEF SUMMARY OF THE INVENTION

The underlying object of the present invention is therefore to specify a system and a method for failsafe energy supply of decentralized element controllers and of the functional units controlled by them, which are characterized by a lower investment and installation outlay and by a high level of supply security.

As regards the device, this object is achieved in accordance with the invention by a device for operating decentralized functional units arranged in an industrial installation, comprising:
a) A superordinate control system which interchanges information with the decentralized functional units by means of data telegrams,
b) A data transport network with a number of network access points, wherein the superordinate control system is coupled via at least one network access point to the data transport network;
c) Communication units, which are connected in each case to a network access point and provide the decentralized functional units with access to the data transport network,
d) An energy transport network to which the decentralized functional units are connected and which supplies the decentralized functional units with electrical energy, wherein the energy transport network has energy injection points, which are arranged distributed along a bus structure of the energy transport network, wherein the energy injection points are optionally able to be supplied with the corresponding electrical power by one of at least two independent energy backbones.

As regards the method, this object is achieved in accordance with the invention by a method for operating decentralized functional units arranged in an industrial installation, said method having:
a) A superordinate control system which interchanges information with the decentralized functional units by means of data telegrams,
b) A data transport network with a number of network access points, whereby the superordinate control system is coupled via at least one network access point to the data transport network;
c) Communication units which are connected to a network access point and provide the decentralized functional units with access to the data transport network,
d) An energy transport network to which the decentralized functional units are connected and which supplies the decentralized functional units with electrical energy, wherein the energy transport network has energy injection points which are arranged distributed along a bus structure of the energy transport network, wherein the energy injection points are optionally able to be supplied with the corresponding electrical power by one of at least two independent energy backbones.

In this way it is possible to supply the energy transport network with the necessary electrical power at any given time, wherein the independence of the two energy backbones is a guarantee that, if there is an outage of one energy backbone, at least the other energy backbone always continues to remain intact in each case. An energy backbone is considered to be the public supply network for example (with Swissgrid AG as the operator in Switzerland for example). Another energy backbone can be the proprietary railroad power system of the railroad infrastructure operator, which for example with Swiss national railways in Switzerland, maintains its own power stations to supply the energy required for the railroad system and can thus operate independently of the public supply network. The proprietary railroad power system also includes the catenary (overhead) wires, which as a rule extend over a wide geographical region. In Switzerland for example the amount of coverage of the major main and branch lines with a catenary wire is almost 100%.

Typically units for monitoring and controlling traffic, such as especially signals, switches, axle counters, track availability notification systems, track circuits, point or linear train-influencing elements, but also track barrier systems, are able to be coupled to the data transport network by means of the decentralized functional units.

In order, on failure of an energy injection point (e.g. systemic failure of the underlying energy backbone), not to have to accept too great track lengths until the next intact energy injection point, there can be provision in an advantageous embodiment of the invention for the energy injection points to be connected alternately in each case to one of the at least two independent energy backbones.

Especially low transmission losses and a sufficiently high power can be achieved in an advantageous development of the invention by the energy transport network being designed at least in part as a direct current bus, which preferably has a voltage of at least 400 VDC. Typically such direct current busses have a voltage of 750 or 800 VDC.

A systemically especially failsafe supply of an energy backbone can be provided if one of the at least two energy backbones has access for its energy generation to at least one water power plant, especially a river power plant and/or a storage lake power plant. The energy able to be generated with these sources guarantees a high availability and thus the required high supply security. It is further advantageous for at least one wind power plant and/or at least one photovoltaic power plant to be able to be accessed here. At the times at which the weather-dependent power sources can make available a lot of energy or only a little energy, then the water power can generate just correspondingly little or correspondingly more electrical energy. Any surplus energy from wind and sun can even be used to pump water up into the storage lake or other reservoir and thus be able to make available energy for days when there is less wind and/or sun.

An especially demand-led solution and one which balances out the load is produced when a number of intelligent energy stores connected to the energy transport network are provided, which accept and/or output energy in co-ordination with a superordinate control system and/or with at least one of the other energy stores.

Further advantageous embodiments of the present invention can be taken from the other subclaims.

BRIEF DESCRIPTION OF THE SEVERAL VIEWS OF THE DRAWING

Advantageous exemplary embodiments of the present invention are explained in greater detail with reference to the drawing. In the figures.

DESCRIPTION OF THE INVENTION

Figure 1:
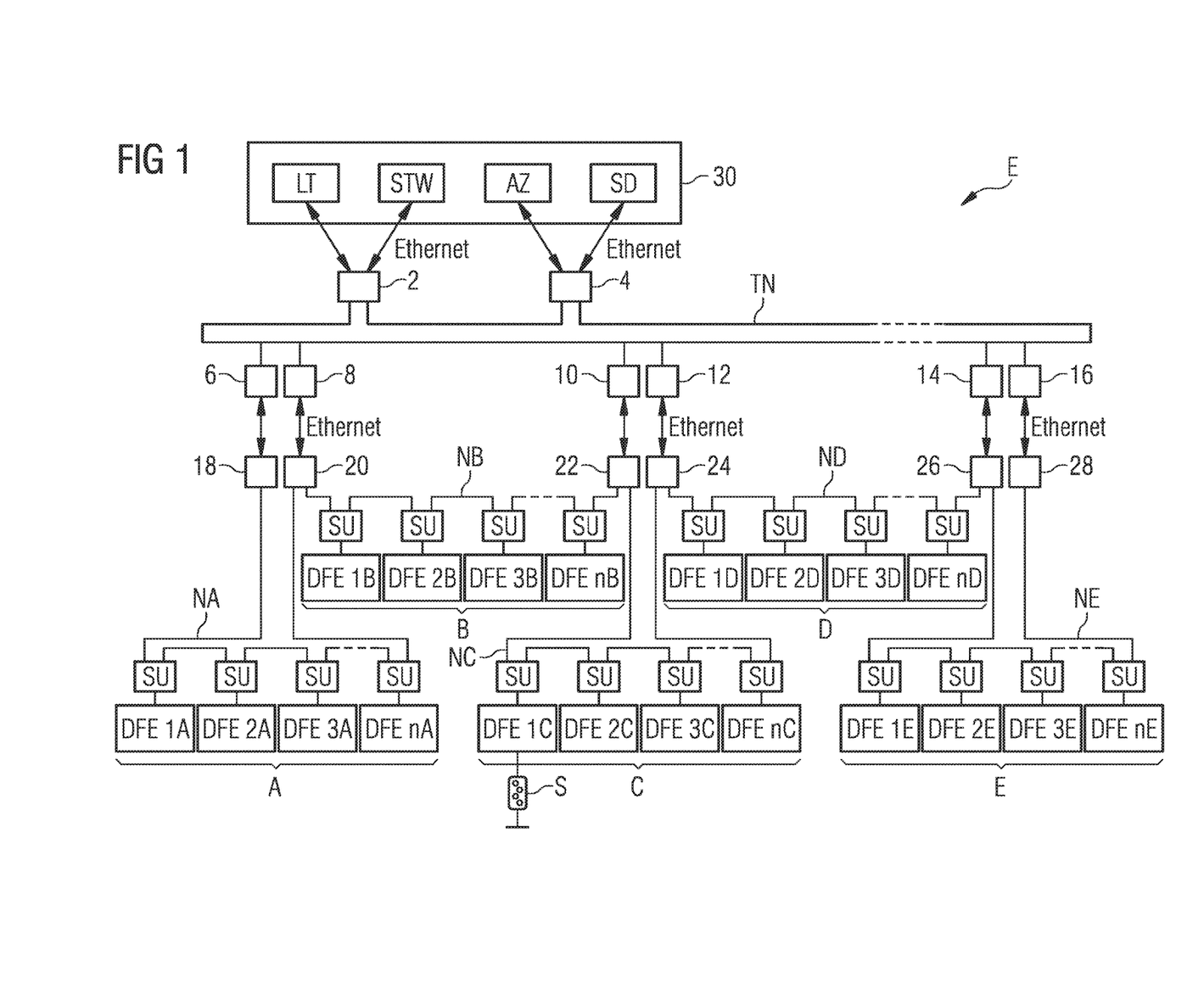
FIG. 1 shows a schematic view of the layout of a device E for control and/or monitoring of decentralized functional units arranged along a railroad network in accordance with EP 2 302 202 A1.

FIG. 1 shows a schematic view of the layout of a device E for control and/or monitoring of decentralized functional units DFE1A to DFEnA, DFE1B to DFEnB etc. (also called element controllers EC below) arranged along a railroad network (not shown in greater detail here). Should a specific functional unit not be meant, the decentralized functional units will be referred to below by the general designation DFE or EC. These types of decentralized functional units DFE are used to control and to monitor train-influencing and/or train-monitoring units. Signals, switches, balises, line cables, track magnets and the like can be referred to as train-influencing units for example. Balises and line cables can likewise be referred to as train-monitoring units, as can axle counters and track circuits. For example a signal S is controlled and monitored by the decentralized functional unit DFE1C. The decentralized functional unit DFE1C in such cases controls the display of the signal terms and guides or assists in monitoring functions respectively, such as the monitoring of the lamp current in the signal for example.

Each decentralized functional unit DFE or the unit controlled/monitored by it respectively has an address unique in the overall network, for example an IP address or a MAC address.

The device E further includes a data transport network TN with a number of network access points 2 to 16. Communication units 18 to 28 are connected to a part of these network access points 6 to 16. The data transport network TN is embodied as a high-availability network here. Such high-availability structures can be produced on the one hand by a redundant design of the network itself and/or on the other hand by a clever re-organization of the network on failure of a connecting piece.

The device E also comprises a superordinate control system 30 which, along with components not described in any greater detail here, include a control center LT, an interlocking processor STW, an axle count processor AZ and a service/diagnosis unit SD, which are connected to the data transport network TN via the network access points 2 and 4 by means of Ethernet connections.

As shown in FIG. 1, the decentralized functional units DFE must be coupled to the transport network TN by one of the communication groups 18 to 28 and the corresponding network nodes 6 to 16 and can thus receive or interchange data telegrams via said network. The decentralized functional units DFE are grouped into subgroups A, B, C, D and E, each with its own subnetwork NA, NB, NC, ND and NE in such cases. The subgroup A is formed for example from the decentralized functional units DFE1A, DFE2A, DFE3A to DFEnA. In such cases the subgroups A to E are always connected at their two ends to one of the communication groups 18 to 28 in each case and a network access point 6 to 16. Each decentralized functional unit DFE also has an upstream switching unit SU or SCU, which, as an alternative, can also be integrated directly into the decentralized functional unit DFE, which establishes the connection to the subnetwork for the decentralized functional units DFE, so that each decentralized functional unit DFE can still be addressed on failure of a communication group by a second redundant communication group 18 to 28.

Each subnetwork (NA to NE) is thus constructed from a number of point-to-point connections of logically-adjacent decentralized functional units (DFE). In such cases a point-to-point connection is embodied as an autonomous transmission link within the subnetwork, for example as an ISDN transmission link or as an xDSL transmission link or optical fiber transmission link. Thus an individual subnetwork, which for its part only ever has to deal with the transmission from point to point, can be constructed so-to-speak from individual transmission cells. In other words a much longer and more complex subnetwork can thus be constructed from simple, rather short-range technologies. For this reason it is expedient to terminate the point-to-point connection at each end with a switching unit (SU), through which the opportunity is even afforded to change the point-to-point transmission technology from cell to cell and thus enable the most suitable transmission technology to be chosen in each case. A suitable switching unit (SU) can be designed for this purpose so that it provides a number of point-to-point transmission technologies and, depending on the circuitry, provides the point-to-point transmission technology determined by the circuitry in a self-organizing manner.

Furthermore the subgroups A to E are each connected to the two communication groups 18 to 28 at a first connection type or a second connection type. In the first connection type, such as is shown for the subgroups A, C and E for example, the associated subnetwork NA, NC and NE is terminated in two geographically closely-located communication groups 18 and 20 or 22 and 24 or 26 and 28, which is to be shown in FIG. 1 by the immediate adjacency of the communication group pairs 18, 20 and 22, 24 and 26, 28. In the second connection type, as is shown for the subgroups B and D, the respective subnetwork NB or ND will be terminated with the spatially more widely spaced communication groups 20, 22 or 24, 26. Here too, on failure of one of the two associated communication groups, each subgroup B and D is then still connected to a further communication group.

If it is now assumed that the network access points 6, 8 and 10, 12 and 14, 16 are each arranged at stations of the railroad network, then the subgroups A, C and E tend to represent the decentralized functional units DFE arranged in the station area. The subgroups B and D tend to represent such decentralized functional units DFE, as are arranged in the area between two stations on open tracks. In such cases the widely-available existing copper cables present in large numbers can possibly be used for the coupling-in of these decentralized functional units DFE, which will be explained using the subgroup B is an example. Previously for example the decentralized functional units DFE1B, DFE2B and DFE3B have been controlled from the station at network access point 8. Accordingly the remaining decentralized network access points DFEnB are controlled from the station at network access point 10. Thus it was sufficient just to establish one connection between the decentralized functional units DFE3B and DFEnB in order to connect the subgroup B in the subnetwork NB together.

The system boundaries of the device E can in this case be described as follows:

The number of network access points 2 to 16 on the transport network OTN is only limited by the system performance (interlocking computer STW, transport network OTN);

The number of DFEs on a subnetwork A to E amounts to a minimum of one DFE: the maximum number of connectable DFEs is limited by the system performance (at least 8 DFEs might be desired for example);

The number of communication units 18 to 28 at a network access point 6 to 16 is essentially limited by the maximum number of Ethernet interfaces of the selected network access points 6 to 16.

The maximum number of subnetworks A to E connectable to a communication unit 18 to 28 can amount to four subnetworks in the exemplary embodiment selected.

to insure high availability it can be stated that one subnetwork A to E must be connected to two communication units 18 to 28;

The communication units 18 to 28 belonging to a subnetwork A to E must be connected to two network access points; in such cases the two network access points 2 to 16 can be connected to the same transport network OTN or to two network access points of two different transport networks (this case for the second transport network OTN has not been shown here but is readily able to be implemented technically).

In order to satisfy the performance requirements and be able to work with simple transmission means such as e.g. ISDN, xDSL, SHDSL, the telegrams can be subdivided into real-time and non-real-time telegrams within the subnetworks A to E:

Real-time telegrams: payload data telegrams from the interlocking to the DFEs as specific TCP/IP telegrams, specific Ethernet frame type;

Non-real-time telegrams: normal TCP/IP telegrams, no payload data telegrams.

The telegram types have fixed timeslots assigned. The assignment can be fixed during operation and be able to be parameterized off-line, for example in a ratio of at least 1 to 10.

Figure 2A:
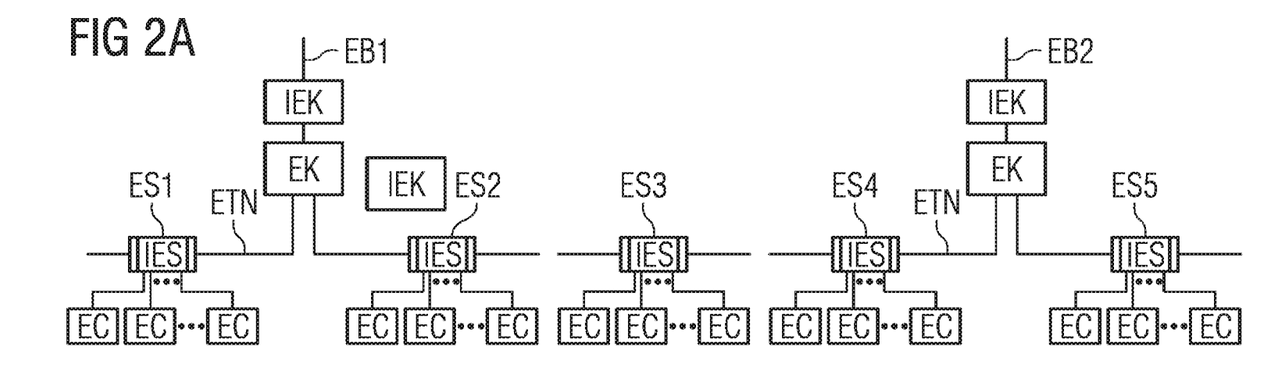
FIG. 2 shows a schematic view of a first embodiment for an energy transport network with variants a) and b)
Figure 2B:
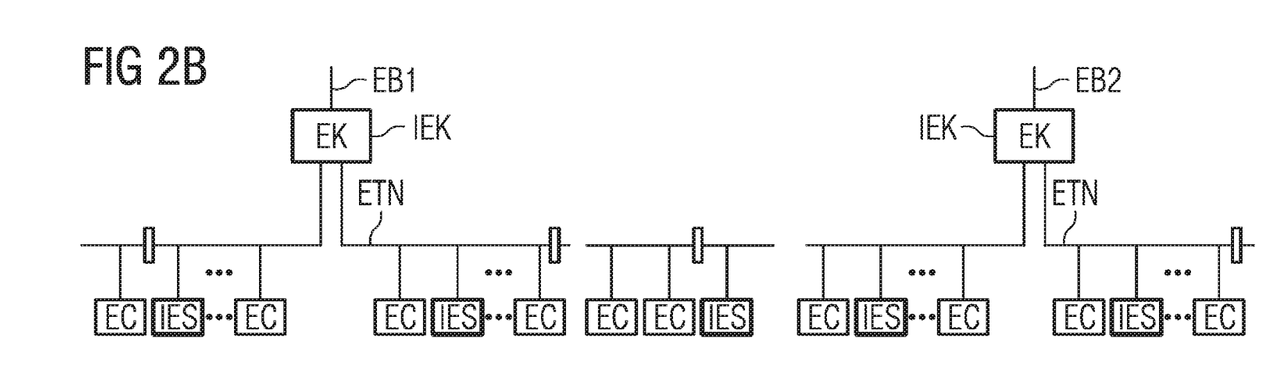

FIG. 2 now shows a schematic diagram of the situation only still applicable as regards data transmission with the inventive energy supply concept in accordance with FIG. 1. All element controllers DFE, EC are now connected to the same data transport network ETN. The electrical energy is now no longer supplied from the central interlocking but is supplied via intelligent energy injection nodes IEK, which have no relationship to the data processing actions of the element controllers EC. Intelligent energy stores IES1 to IES5 are now connected to the energy transport network ETN at suitable positions of the energy transport network ETN, so that these intelligent energy stores IES1 to IES5 can undertake data communication via the data transport network TN with the central interlocking STW and thus power can be accepted and/or output in a controlled manner via an energy manager IEM implemented in the logic of the central interlocking STW.

Figure 3A:
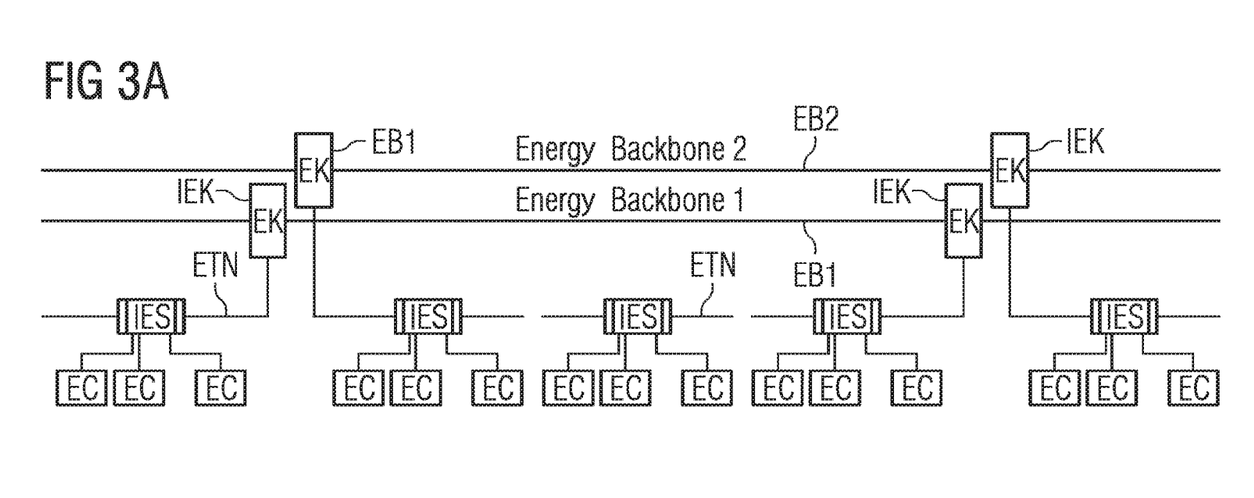
FIG. 3 shows a schematic view of a second embodiment for an energy transport network with variants a) and b)
Figure 3B:
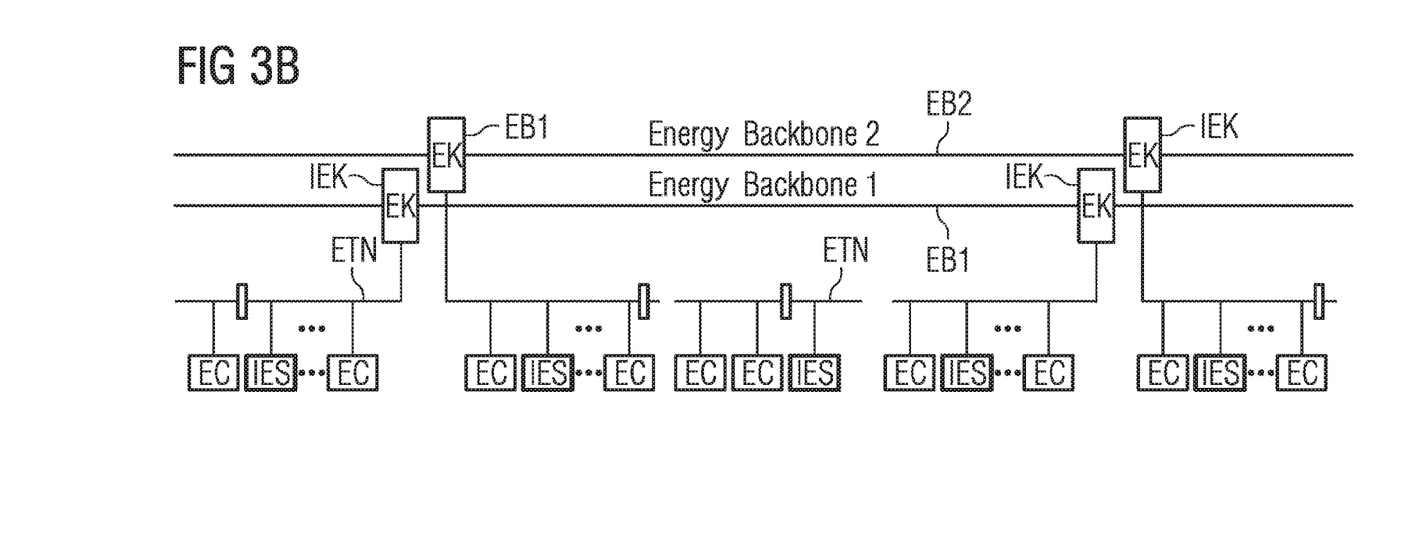

The energy needed in the energy transport network ETN is provided in this case to the two intelligent energy injection nodes IEK shown here by two energy backbones EB1 and EB2 independent of one another. In this present case the energy backbone 1 is the public uninterruptible power supply network (local network). The energy backbone EB2 is supplied from the catenary wire of the railroad network, wherein the power supply for the catenary wire is a proprietary structure of the railroad operator, which for this purpose has its own power plants independent of the public power supply network. In the variant a) shown in FIG. 2 the element controllers EC are each supplied, combined into groups, by one intelligent energy store IES1 to IES5. In the variant b) shown the energy transport network ETN forms an energy bus extending from the one intelligent energy injection node to the other intelligent energy injection node IEK, to which the element controllers EC and the intelligent energy stores IES each couple independently. FIG. 3 now shows a second variant for an energy transport network ETN, in which two redundantly embodied energy backbones EB1 and EB2 are provided. In this figure the energy transport network ETN is designed in the form of a bus between two intelligent energy injection nodes IEK, wherein one intelligent energy injection node is supplied by the first energy backbone EB1 and the other intelligent energy injection node is supplied by the second energy backbone EB2. Part a) again shows the element controllers EC coupling in groups to an intelligent energy store IES. Part b) again includes the individual connection of the element controllers EC and the intelligent energy stores to the energy transport network ETN. In the final analysis the configuration of the intelligent energy injection nodes IEK depends on the hierarchical structure of the energy backbone provided. If for example, during a blackout of the local network, there is an outage of two neighboring stations, then it is sensible to connect the other energy backbone to one of the two stations in each case.

Figure 4A:
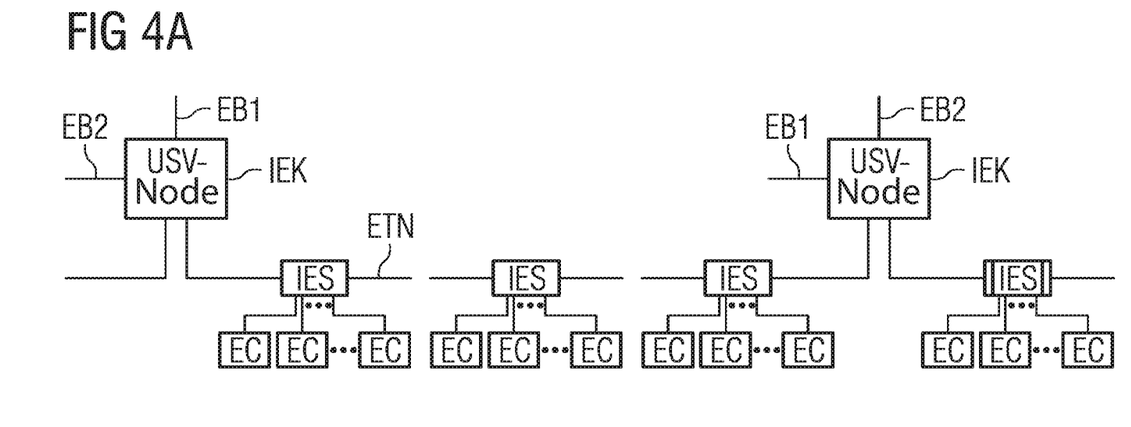
FIG. 4 shows a schematic view of a third embodiment for an energy transport network with variants a) and b)
Figure 4B:
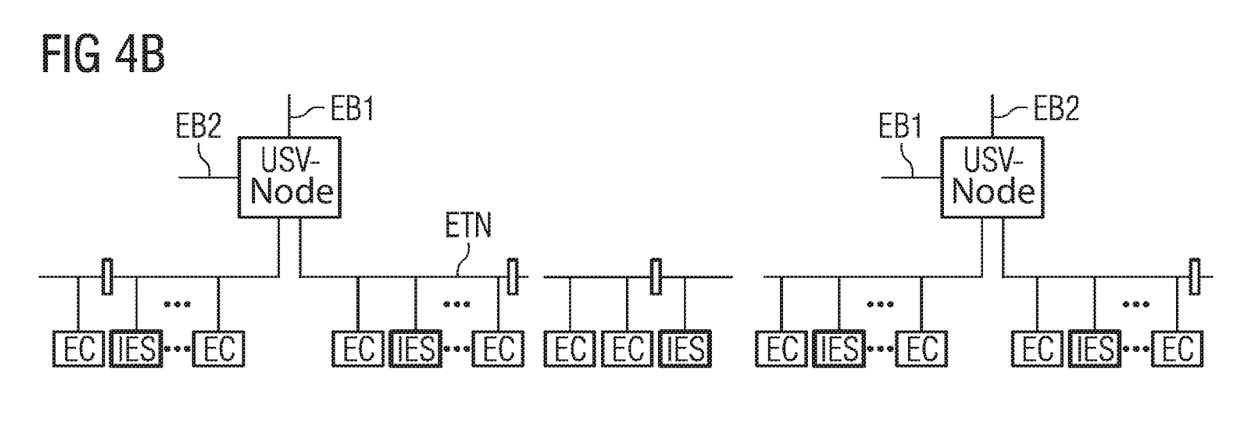

FIG. 4 shows a slightly modified variant by comparison with FIG. 2, in which only the intelligent energy injection nodes IEK are attached to the energy backbones EB1 and EB2 in each case.

Figure 5:
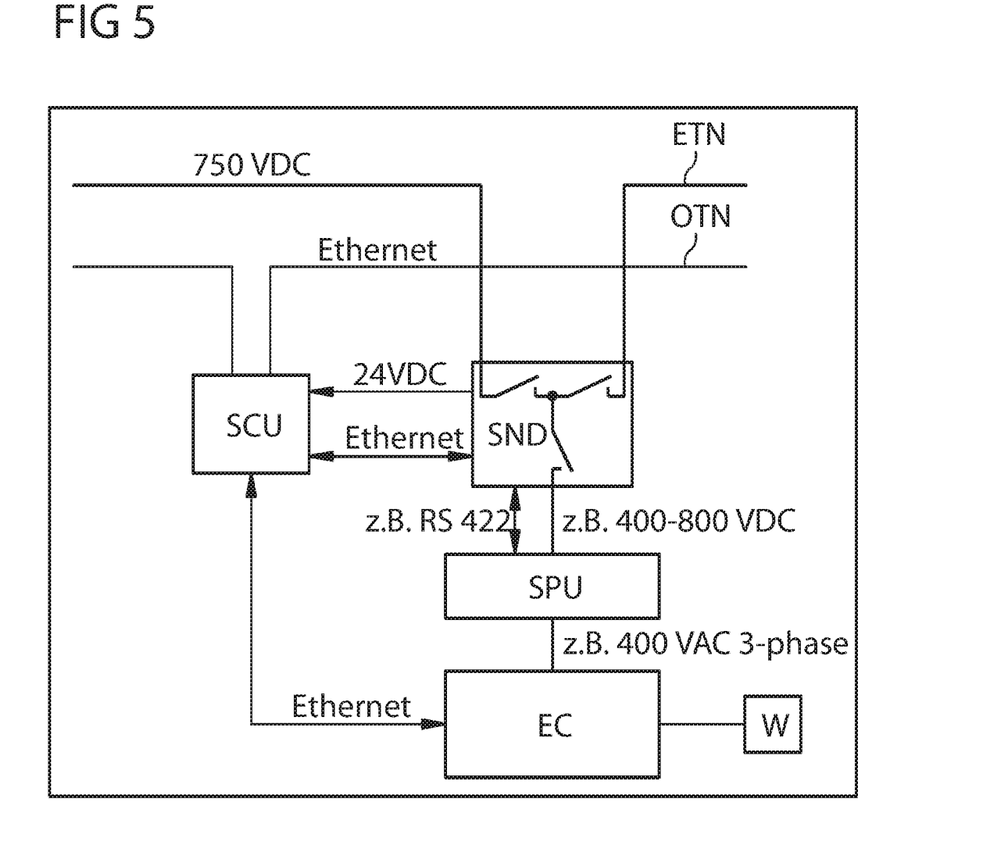
FIG. 5 shows a schematic view of the layout of an intelligent energy store.

FIG. 5 now shows schematically the connection of an element controller EC to the data transport network OTN or the energy supply network ETN in terms of data processing and energy supply. Such a connection point comprises a communication unit SCU for interchange of data via both branches of the data transport network OTN. On the energy side a network node unit SND is provided which couples to both branches of the energy transport network ETN. The network node unit SND controls and supervises the energy bus, detects excess currents within the bus and in connected consumers (SPU with EC). It also supplies the communication unit SCU with power and can also interchange data with said unit via an Ethernet connection and is thus linked into the Sinet network (e.g. activation of manual operation of the SND via remote operation and actuation of the energy switch, output of diagnostic data to the superordinate service and diagnosis system, interrogating the current voltages, currents, energy and power values, parameterization of the SND, data for charging an energy store or notification of a future power requirement). A supply unit SPU couples to the network node unit SND, which converts the voltage of the transport network to the input voltage required for the EC. In addition a data connection is provided between the network node unit SND and the supply unit SPU, e.g. in the form of a serial RS 422. A typical connection here in energy terms for example is a three-phase connection with 400 VAC. Here in FIG. 5 the element controller EC controls and supplies the switch W. In this figure the element controller EC receives data telegrams from superordinate interlocking computers via an Ethernet connection from the communication unit SCU and outputs the acknowledgements to the interlocking computer via this SCU.

In the way shown here it is possible to supply the energy transport network ETN with the required electrical power at any time, wherein the independence of the two energy backbones EB1, EB2 is a guarantee that, should one energy backbone fail, at least the other energy backbone remains intact, which guarantees a supply security of almost 100%. An energy backbone is considered to be the public supply network for example (with Swissgrid AG as the operator in Switzerland for example). Another energy backbone can be the proprietary railroad power system (catenary/overhead wire) of the railroad infrastructure operator, which for example with Swiss national railways in Switzerland, maintains its own power stations to supply the energy required for the railroad system and can thus operate independently of the public power supply network.

The invention claimed is:

1. A device for operating decentralized functional units arranged in a railroad network for railroad traffic, comprising:
   a) a superordinate control system configured to interchange information with the decentralized functional units by way of data telegrams including real-time data telegrams and non-real-time data telegrams;
   b) a data transport network with a plurality of network access points, said superordinate control system being coupled to said data transport network via at least one network access point;
   c) communication units connected in each case to a network access point and providing said decentralized functional units with access to said data transport network;
   d) an energy transport network having said decentralized functional units connected thereto and supplying said the decentralized functional units with electrical energy, said energy transport network having a plurality of energy injection nodes distributed along a bus structure of said energy transport network, said energy injection nodes being selectively supplied with electrical power by one of at least two independent energy backbones, said at least two independent energy backbones including a first backbone being a public power supply network and a second backbone being a power supply network of a railroad, said energy injection nodes being intelligent energy injection nodes connected along the bus structure, alternating in each case, to one of the at least two independent energy backbones, wherein at least two of said energy injection nodes are connected to a first one of the at least two independent energy backbones and at least two of said energy injection nodes are connected to a second one of the at least two independent energy backbones.

2. The device according to claim 1, wherein the railroad network includes units for monitoring and controlling traffic to be coupled to the energy transport network by way of said decentralized functional units.

3. The device according to claim 2, wherein the units for monitoring and controlling traffic are selected from the group consisting of signals, switches, axle counters, track circuits, and point and line-type train-influencing elements.

4. The device according to claim 1, wherein said energy transport network is, at least in part, a direct current bus.

5. The device according to claim 4, wherein the direct current bus has a voltage of at least 400 VDC.

6. The device according to claim 1, wherein an energy backbone has access to at least one hydro power plant for energy generation.

7. The device according to claim 6, wherein at least one wind power plant and/or at least one photovoltaic power plant are additionally able to be accessed.

8. The device according to claim 1, which further comprises a plurality of intelligent energy storage devices connected to said energy transport network, for accepting and/or outputting energy in co-ordination with said superordinate control system and/or with at least one other of said energy storage devices.

9. A method for operating decentralized functional units arranged in a railroad network for railroad traffic, comprising:
   a) interchanging information between a superordinate control system and the decentralized functional units by way of data telegrams including real-time data telegrams and non-real-time data telegrams;
   b) coupling a data transport network to the superordinate control system through a plurality of network access points;
   c) providing the decentralized functional units access to the data transport network by communication units, which are connected in each case to a network access point; and
   d) supplying the decentralized functional units with electrical energy with an energy transport network to which the decentralized functional units are connected, the energy transport network having intelligent energy injection nodes, which are distributed along a bus structure of the energy transport network, and selectively supplying the intelligent energy injection nodes with electrical power by one of at least two independent energy backbones, the at least two independent energy backbones including a first backbone being a public power supply network and a second backbone being a power supply network of a railroad, the intelligent energy injection nodes being connected along the bus structure, alternating in each case, to one of the at least two independent energy backbones, wherein at least two of said energy injection nodes are connected to a first one of the at least two independent energy backbones and at least two of said energy injection nodes are connected to a second one of the at least two independent energy backbones.

10. The method according to claim 9, wherein the railroad network includes units for monitoring and controlling traffic to be coupled to the energy transport network by way of the decentralized functional units.

11. The method according to claim 10, wherein the units for monitoring and controlling traffic are selected from the group consisting of signals, switches, axle counters, track circuits, and point and line-type train-influencing elements.

12. The method according to claim 9, wherein the energy transport network is, at least in part, a direct current bus.

13. The method according to claim 12, wherein the direct current bus has a voltage of at least 400 VDC.

14. The method according to claim 9, wherein an energy backbone has access to at least one hydro power plant for energy generation.

15. The method according to claim 14, wherein at least one wind power plant and/or at least one photovoltaic power plant are additionally able to be accessed.

16. The method according to claim 9, which comprises connecting a plurality of intelligent energy storage devices to the energy transport network, the energy storage devices accepting and/or outputting energy in co-ordination with the superordinate control system and/or with at least one other energy store.

* * * * *